United States Patent
Mills

(10) Patent No.: US 10,197,978 B2
(45) Date of Patent: Feb. 5, 2019

(54) ADAPTIVE EJECTOR VALVE ARRAY

(71) Applicant: Buhler Sortex Ltd, London (GB)

(72) Inventor: Stewart John Mills, Essex (GB)

(73) Assignee: Buhler Sortex, Ltd., London (GB)

( * ) Notice: Subject to any disclaimer, the term of this patent is extended or adjusted under 35 U.S.C. 154(b) by 0 days.

(21) Appl. No.: 14/438,714

(22) PCT Filed: Oct. 24, 2013

(86) PCT No.: PCT/EP2013/072329
§ 371 (c)(1),
(2) Date: Apr. 27, 2015

(87) PCT Pub. No.: WO2014/064222
PCT Pub. Date: May 1, 2014

(65) Prior Publication Data
US 2015/0253746 A1    Sep. 10, 2015

(30) Foreign Application Priority Data

Oct. 25, 2012  (GB) .................................. 1219184.7

(51) Int. Cl.
*F16K 31/06*   (2006.01)
*G05B 13/02*   (2006.01)
(Continued)

(52) U.S. Cl.
CPC ............ *G05B 13/021* (2013.01); *B07C 5/363* (2013.01); *F16K 31/02* (2013.01); *F16K 31/0675* (2013.01)

(58) Field of Classification Search
CPC ......... B07C 5/361; B07C 5/363; B07C 5/367; B07C 5/368; F16K 31/02; F16K 31/06;
(Continued)

(56) References Cited

U.S. PATENT DOCUMENTS 4,203,522 A   5/1980   Fraenkel et al.
4,513,868 A   4/1985   Culling et al.
(Continued)

FOREIGN PATENT DOCUMENTS

CN    102261506 A    11/2011
EP      1862659 A1   12/2007
(Continued)

OTHER PUBLICATIONS

International Search Report and Written Opinion for application No. PCT/EP2013/072329 dated Jan. 21, 2014.

*Primary Examiner* — Joseph C Rodriguez
(74) *Attorney, Agent, or Firm* — Renner, Otto, Boisselle & Sklar LLP

(57) ABSTRACT

A method for providing adaptive control of the flow of a plurality of ejector valves arranged in close proximity to each other in a sorting machine is described. The method comprises measuring a temporal response curve for each ejector valve, comparing the measured temporal response curve for each ejector valve to a library set of previously stored temporal response curves, determining from the comparison a predicted flow for each ejector valve, and adapting a drive signal for each ejector valve in dependence on the predicted flow. Temporal response curves may be measured and compared in a calibration (non-sorting) mode, and real-time feedback of the measured temporal responses in a sorting mode may be used to indicate health of a valve and to further adapt the drive signal to provide conformal performance. The number of neighboring ejector valves may also be taken into account.

19 Claims, 4 Drawing Sheets

(51) Int. Cl.
*B07C 5/36* (2006.01)
*F16K 31/02* (2006.01)

(58) Field of Classification Search
CPC ............. F16K 31/0675; F16K 37/0083; G05B 13/021; G05B 13/024
See application file for complete search history.

(56) References Cited

U.S. PATENT DOCUMENTS

| | | | |
|---|---|---|---|
| 4,699,273 A | 10/1987 | Suggi-Liverani et al. | |
| 4,974,622 A | 12/1990 | Rader | |
| 5,289,841 A * | 3/1994 | Maranzano | F16K 31/0606 137/1 |
| 5,389,781 A * | 2/1995 | Beck | A01M 7/0089 209/582 |
| 5,520,290 A * | 5/1996 | Kumar | B07C 5/3422 198/349.1 |
| 5,628,411 A * | 5/1997 | Mills | B07C 5/3425 209/644 |
| 6,889,121 B1 | 5/2005 | Shahroudi et al. | |
| 7,121,399 B2 * | 10/2006 | Mills | B07C 5/363 198/370.11 |
| 7,360,750 B2 * | 4/2008 | Yano | F16K 31/006 251/129.01 |
| 7,658,291 B2 * | 2/2010 | Valerio | B07C 5/344 209/44.2 |
| 7,740,140 B2 * | 6/2010 | Schmidt | B30B 11/005 209/44.2 |
| 8,809,718 B1 * | 8/2014 | Doak | B07C 5/342 209/576 |
| 9,114,430 B2 * | 8/2015 | Ito | F16K 31/004 |
| 9,120,323 B2 * | 9/2015 | Tanaka | B41J 2/14233 |
| 2002/0134713 A1 * | 9/2002 | Hinzpeter | B07C 5/363 209/644 |
| 2004/0206409 A1 * | 10/2004 | Yano | F16K 31/006 137/883 |
| 2007/0018534 A1 * | 1/2007 | Sciortino | F16K 31/004 310/316.01 |
| 2007/0056887 A1 * | 3/2007 | Neuhold | B07C 5/368 209/646 |
| 2009/0251536 A1 * | 10/2009 | Sinram | B07C 5/342 348/91 |
| 2011/0015792 A1 * | 1/2011 | Wahlmann | F15B 19/005 700/282 |
| 2011/0284431 A1 | 11/2011 | Ito et al. | |
| 2014/0129035 A1 * | 5/2014 | Marquette | B62D 5/075 700/282 |
| 2014/0339141 A1 * | 11/2014 | Ito | B07C 5/3425 209/552 |
| 2016/0107198 A1 * | 4/2016 | Ackley | B07C 5/3422 209/551 |
| 2016/0273676 A1 * | 9/2016 | Junk | F16K 37/0083 |
| 2016/0274594 A1 * | 9/2016 | Inoue | F16K 37/0041 |

FOREIGN PATENT DOCUMENTS

| | | | |
|---|---|---|---|
| GB | 2025038 | 1/1980 | |
| GB | 2370376 | 6/2002 | |
| GB | 2497977 A * | 7/2013 | ......... F02D 41/0077 |
| JP | 11/201314 | 7/1999 | |

* cited by examiner

ADAPTIVE EJECTOR VALVE ARRAY

This application is a national phase of International Application No. PCT/EP2013/072329 filed Oct. 24, 2013 and published in the English language.

TECHNICAL FIELD

This invention relates to methods and apparatus for adaptive control of an ejector valve array, and in particular to methods to provide conformal performance of such arrays. The invention has particular, but not exclusive, application in the field of sorting apparatus or machines.

BACKGROUND

Arrays of ejector valves are used in sorting apparatus in which material to be sorted is directed in a product stream following an aerial path, and where certain material is removed from the stream by pulses from the ejector valves. The ejector valves control the delivery of a fluid, such as air, from a pressurised source to an ejector nozzle directed at a particular section of the product stream. A mechanism, typically comprising an electromagnet, acts to open each valve in the array selectively in response to a control signal to deliver a pulse of pressurised fluid to, and thus from, the respective nozzle thereby ejecting or removing certain material or particles from the product stream.

In one known sorting application, a sorting apparatus having pneumatic ejectors sorts particulate material according to its ability to reflect light as described in GB-A-2025038, in which detectors are responsive to light reflected from the particles of product and generate signals indicative of different qualities of the product. These signals are compared and analysed, to generate an electrical control signal, which can activate an ejector valve to remove the relevant particle from the product stream.

The relative performance of such ejector valves can be a problem in that different valves, receiving the same control signal, may perform differently due to age, machining or manufacturing variations and tolerances.

U.S. Pat. No. 4,974,622 describes a method of self compensation for duty cycle control of a solenoid valve typically used in a fuel injection engine. The method disclosed involves measuring the nominal stop time for a valve to move from a first position (start) to a second position (stop), and subsequently adjusting this stop time by a deviation time determined by actual sensing of the movement of the valve.

U.S. Pat. No. 6,889,121 describes a method to adaptively control and derive the control voltage of solenoid operated valves based on the valve closure point. An initial estimate of the valve closure point is derived and this is updated by measuring the coil current feedback in use.

The methods described above generally relate to controlling a single valve without compensating for local environmental effects due in part to a large number of valves arranged in an array as found in sorting machines.

In particular, an array of ejector valves necessarily has many ejector valves and solenoids in close proximity or adjacent to each other. A problem exists in such environments due to temperature and especially electromagnetic noise variations which can interfere or influence neighbouring valves. Therefore, problems in performance in an array of ejector valves are compounded, since the ejector valves influence each other to varying degrees, in addition to the increased temperature and manifold pressure variations and each valves individual wear and tear. It will be appreciated that, in such a complex system, many additional factors cause problems leading to overall degradation or non-conformal performance.

Hence the calibration and subsequent controlling or compensation of such an array is not a trivial exercise in such environments.

Additionally, the replacement of individual ejector valve assemblies within the array can, over time, lead to an array with a mixture of old and newer ejector valves. This may provide slightly different individual valve performances and therefore exacerbate or add to the other factors mentioned above in relation to the hostile operating environment. This can lead to differing fluid flow temporal responses for each ejector, which results in non-conformal product stream sorting or rejection.

There is therefore a desire for improved prediction and real time adjustment techniques for driving an array of ejector valves in, for example, a sorting machine, to correlate fluid flows from the array as a whole within performance targets.

SUMMARY OF INVENTION

In a first aspect of the present invention, there is provided a method for providing adaptive control of the flow of a plurality of ejector valves arranged in an array in a sorting machine, comprising measuring a temporal response curve for each ejector valve, comparing the measured temporal response curve for each ejector valve to a library set of previously stored temporal response curves, determining from the comparison a predicted flow for each ejector valve, and adapting a drive signal for each ejector valve in dependence on the predicted flow.

In a second aspect there is provided sorting apparatus comprising a plurality of ejector valves arranged in an array, and having at least one processing and control module adapted to perform the method of the first aspect of the present invention.

In a third aspect there is provided sorting apparatus comprising a plurality of ejector valves arranged in an array, wherein each ejector valve opens and closes in response to an electrical drive signal, and having a sensor arrangement for measuring electrical or magnetic temporal responses of each ejector valve to indicate the flow of that or each ejector valve, and further comprising at least one processing and control module configured to provide an adapted drive signal to each ejector valve in dependence on the temporal responses.

In yet a further aspect there is provided a computer program for causing a processor in a sorting apparatus to carry out the method of the first aspect of the present invention.

Certain aspects of the electrical temporal responses of such fluid flow control valve assemblies have been found to be sufficiently representative of the fluid flow temporal response of the valves, that is, representative of the opening and/or closing of the valve so as to emit a jet of fluid. Thus, the fluid flow temporal responses of an array of valves can be obtained by computations based on measured electrical or magnetic temporal responses. In this way variations in the fluid flow temporal responses of valves in an array can be adapted for by applying suitably modified or adapted electrical drive signals or timings to each of the valves in the array.

The first aspect of the invention provides for the measuring of each ejector valve in an array when the machine is not sorting, in a "static" or "calibration" mode.

The measuring provides a temporal response curve for each valve which determines opening and closing times for that valve. This curve may be obtained by measuring current, rate of change of current, or voltage supplied to the valve against time, or magnetic flux or flux linkage or other suitable parameters indicative of the temporal response of the valve. This is then compared with a previously determined library set of stored temporal response curves. The comparison is then used to predict the flow or timing of each valve and hence a drive signal is adapted in dependence on the comparison. This is repeated for all valves in the array and the timing adapted so as to provide a correlated flow response from the array.

Advantageously, the library set of previously stored temporal response curves includes information concerning the number of individual neighbouring valves each valve has in the array. Hence, the selection of relevant previously stored curves for the array as a whole takes into account different array configurations and arrangements of valves. Hence, local electromagnetic effects that neighbouring valves may impose on their neighbours are considered and automatically included in the calculation.

In this way closely correlating predictor curves are matched to the valve, providing general timing adaptations within user-set thresholds of performance.

In a further advantageous embodiment, whilst actively sorting (active mode), monitoring and feedback of the performance of the valves via measured temporal response curves is provided, to further update the previously predicted flow from the statistical model determined in the static mode. Hence iterative feedback over time is provided to improve the valve array correlation.

This allows for improved conformal performance despite wear and tear in individual valves, locally changing electromagnetic or temperature variations, or even replacement of a valve in such in an array.

If the array is calibrated or checked regularly, then variations in the wear of the ejector valves can be compensated for. This means that each valve is opened at a first predetermined time delay and/or closed at a second predetermined time delay after a respective reject particle is detected, with minimal variation between the time delays associated with different valves. This greatly enhances the accuracy of sorting which can be achieved by a sorting machine calibrated according to the present invention.

Each ejector valve may comprise an electromagnetic assembly, for controlling movement of the valve in response to an electrical drive signal. The electromagnetic assembly will generally comprise an electromagnet for facilitating opening and closing of the associated valve. In this case, the one or more measured electrical temporal responses may correspond to a temporal response of the associated electromagnetic assembly.

The drive signal, which may be a current or a voltage pulse, may comprise sequentially in time at least the following portions: a peak for opening the valve ("boost") and a "hold" period, which may be implemented as a central plateau of the drive signal, for maintaining the valve in its open position. In addition, the drive signal may comprise sequentially after the "hold" period, one or more of the following: a decay of the drive signal; and a trough of opposite polarity to the peak; so as to facilitate closure of the valve.

The measurement of the one or more electrical or magnetic temporal responses may comprise at least one of the following:

driving an electromagnet to facilitate opening and/or closing of the valve and measuring the time taken for the current in the electromagnet to rise to a given threshold in response to the application of a drive signal;

driving an electromagnetic assembly to facilitate opening and/or closing of the valve and measuring the time at which the current in the electromagnetic assembly, i, or the rate of change of current in the electromagnetic assembly with respect to time, dI/dt, reaches a predetermined value in response to the application of a drive signal;

driving an electromagnetic assembly to facilitate opening and/or closing of the valve and measuring the current in the electromagnetic assembly, I, or the rate of change of current in the electromagnetic assembly with respect to time, dI/dt, at a predetermined time delay after the application of a drive signal; and driving an electromagnet assembly to facilitate opening and/or closing of the valve and measuring or estimating the changes in flux or flux linkage in the electromagnet as the current in the electromagnet increases and then comparing the values of current at any point in time to the associated flux or flux linkage at the same point in time.

These measurements may comprise a single measurement or a series of repeated measurements, depending on which electrical responses are measured. It will be clear to a person skilled in the art that there are other ways of measuring the electrical temporal responses, not all of which are mentioned here. In particular it would be possible to attempt to drive the valve assembly at constant current or at a known rate of change of current and measure voltage levels.

The electrical drive signal for each ejector valve may be adapted, for example, by:

adjusting a time delay before the drive signal is applied;
adjusting the length of the drive signal;
adjusting the applied voltage;
adjusting the height and/or length of a peak at the beginning of the drive signal;
adjusting the height and/or length of a hold period of the drive signal;
adjusting a rate of decay at the end of the drive signal; and
adjusting the depth and/or length of a trough at the end of the drive signal.

The method according to the first aspect of the present invention may be implemented partially or fully by software provided to a processing and control module and/or by electronic circuitry.

In an embodiment of the sorting apparatus according to the second and/or third aspect of the present invention, the processing and control module may additionally comprise at least one sensing element or sensing arrangement for measuring the performance of an ejector valve.

In a particular embodiment, the sensor arrangement may include a current sensor for each ejector valve.

In another embodiment, the measured temporal response curves are used to gauge the health of an ejector valve, and the drive signal is further adapted in dependence on this health.

In yet another embodiment, the health of a valve is defined by its ability to operate within a sorting parameter window, which depends on the product being sorted and desired throughput.

Further optional features will be apparent from the following description and accompanying claims.

BRIEF DESCRIPTION OF THE DRAWINGS

Embodiments of the present invention will now be described, by way of example only, with reference to the accompanying drawings, in which:

FIG. 2 illustrates the construction of a typical ejector valve used in the valve array of FIG. 1a;

DETAILED DESCRIPTION OF THE EMBODIMENTS

The term "electrical or magnetic temporal responses" includes electrical responses to signals of magnetic origin.

Figure 1A:
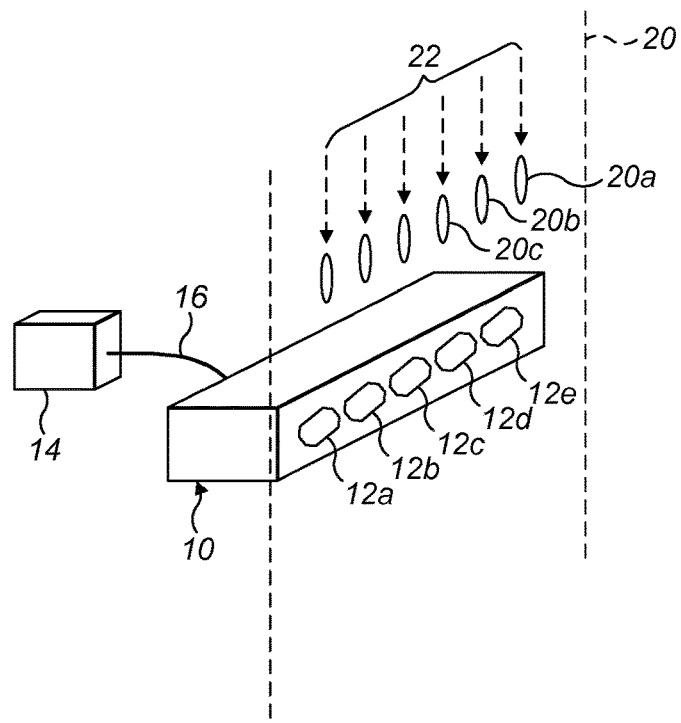
FIG. 1a illustrates an ejector valve array for ejecting a product from a product stream.

FIG. 1a is a perspective view of an embodiment of an ejector array housing 10 having a plurality of ejector valves 12a; 12b; 12c; 12d; 12e in close proximity to each other. The ejector valves 12a; 12b; 12c; 12d; 12e are connected to a processing and control module 14 via link 16. Whilst the number of ejector valves shown (for simplicity) is a one dimensional array of five, those skilled in the art will appreciate that many more ejectors in two or three dimensional array configurations may be employed. For example, in sorting machine applications, it is not uncommon for array configurations having 64 or even 78×6=468 ejector valves in an array to be utilised.

The housing 10, associated ejector valves 12a; 12b; 12c; 12d; 12e and processing and control module 14 and link 16 are part of a sorting machine (not shown). The sorting machine provides a material stream or product stream 20 for sorting which may comprise individual particles, pellets or units 20a; 20b; 20c (for example, rice grains or plastic pellets). The ejector valves 12a; 12b; 12c; 12d; 12e are positioned so as to intercept the product stream 20. Typically, such a product stream 20 may have a lateral width of 30 cm, across which, for example, an array of equally spaced 64 or more ejector valves 12a; 12b; 12c; 12d; 12e is arranged to enable sorting as shall now be described with the aid of FIG. 1b.

Figure 1B:
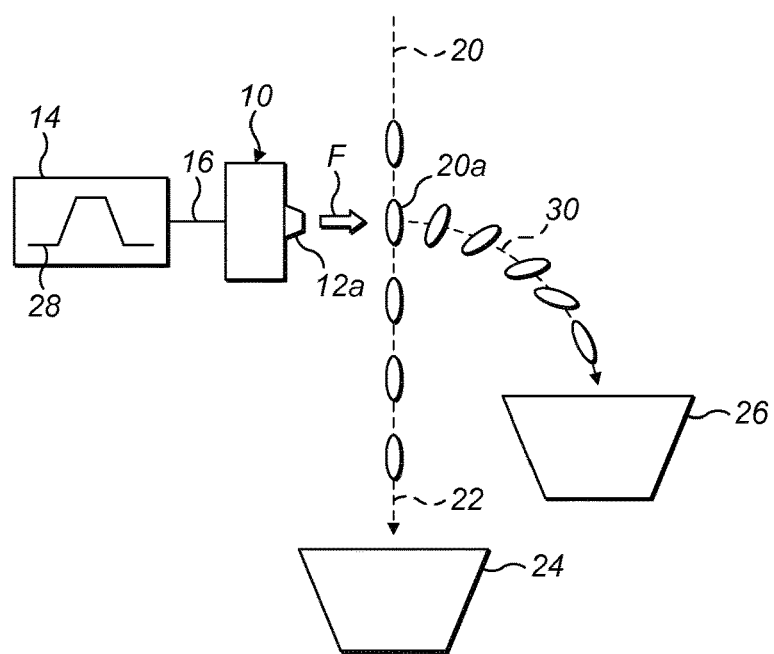
FIG. 1b is another view of the valve array of FIG. 1a, depicting the array of ejector valves facing the product stream and ejecting product therefrom.

FIG. 1b is a side view of the arrangement of FIG. 1a showing, for purposes of clear illustration, a single ejector valve 12a arranged to face product stream 20. The product stream 20 follows trajectory 22 into pathway or bucket or hopper 24 if the ejector valve 12a is not triggered by the processing and control module 14.

FIG. 1b also shows the trajectory 30 taken by a particle 20a of product stream 20 when the ejector valve 12a is triggered to eject a fluid F (in this example air) by the processing and control module 14 providing an adapted timing signal 28. In this case, the unit or pellet 20a is directed by fluid flow F (such as an air "puff") to an alternative pathway or bucket or hopper 26. Pathway, bucket or hopper 26 may designate "reject" material, or in other applications may designate a particular type of material that is desirably sorted from the stream 20 for alternative processing.

Whilst FIG. 1b illustrates buckets or hoppers 24, 26, it will be appreciated that these are schematic only, and in an industrial automated environment the sorting streams could feed into conveyor belts or other apparatus providing pathways or flows for further suitable processing.

The sorting machine comprises vision or colour or shape detection systems, as well known in the art, to provide a trigger signal to the processing and control module 14. For example, an off-colour (non-white) grain of rice may be detected by such a system slightly upstream of the ejector array, and the trigger or "reject" signal is subsequently input to the processing and control module 14. The processing and control module 14 is thus triggered to generate a temporal drive signal 28 to the ejector to eject the "reject" particle or pellet from the stream 20 to bucket or hopper 26.

The temporal drive signal 28 is adapted for each individual ejector valve so as to allow for a predicted flow F for each individual ejector valve 12a; 12b; 12c; 12d; 12e.

The ejector valves 12a; 12b; 12c; 12d; 12e in the array 10 preferably have nozzles directed towards particular target areas of the product stream 20, and are connected to a source of air under pressure via a manifold.

Those skilled in the art will also appreciate that, in some sorting configurations and applications, the dimensions of the product being sorted (for example, rice grains or other similar sized grains) dictates the spacing and nozzle size of each ejector.

In such applications the ejector nozzles 12a; 12b; 12c; 12d; 12e may be grouped themselves and the group served by a shared actuator (for example a pneumatic actuator) and connected to the actuator via plastic tubing due to space constraints.

In some sorting applications, the ratio of nozzles to actuators may be 4:1.

Figure 2:
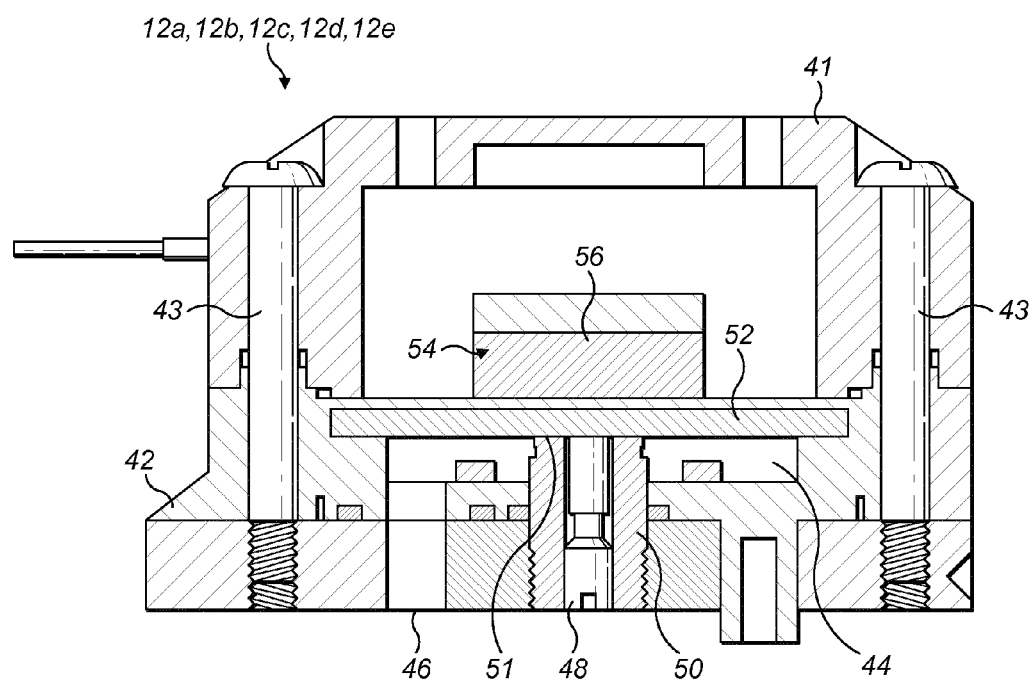

A typical construction of an individual ejector valve 12a; 12b; 12c; 12d; 12e is shown in FIG. 2. The ejector valve 12a; 12b; 12c; 12d; 12e comprises a housing comprising two parts 41, 42 held together by screws 43 and defining a valve chamber 44 which receives pressurised air from a source (not shown) through an inlet port 46. The output port 48 from the chamber 44 is connected to the chamber 44 through an output duct body 50 upon the end face of which is a valve seat 51. The valve seat 51 is closed by a valve plate 52. The plate 52 is formed in a magnetizable material, and is withdrawn from the valve seat 51 to open the valve by selective activation of an electromagnetic assembly 54. The electromagnetic assembly 54 includes an electromagnet which is activated and deactivated by the application of an electrical drive signal.

Figure 3:
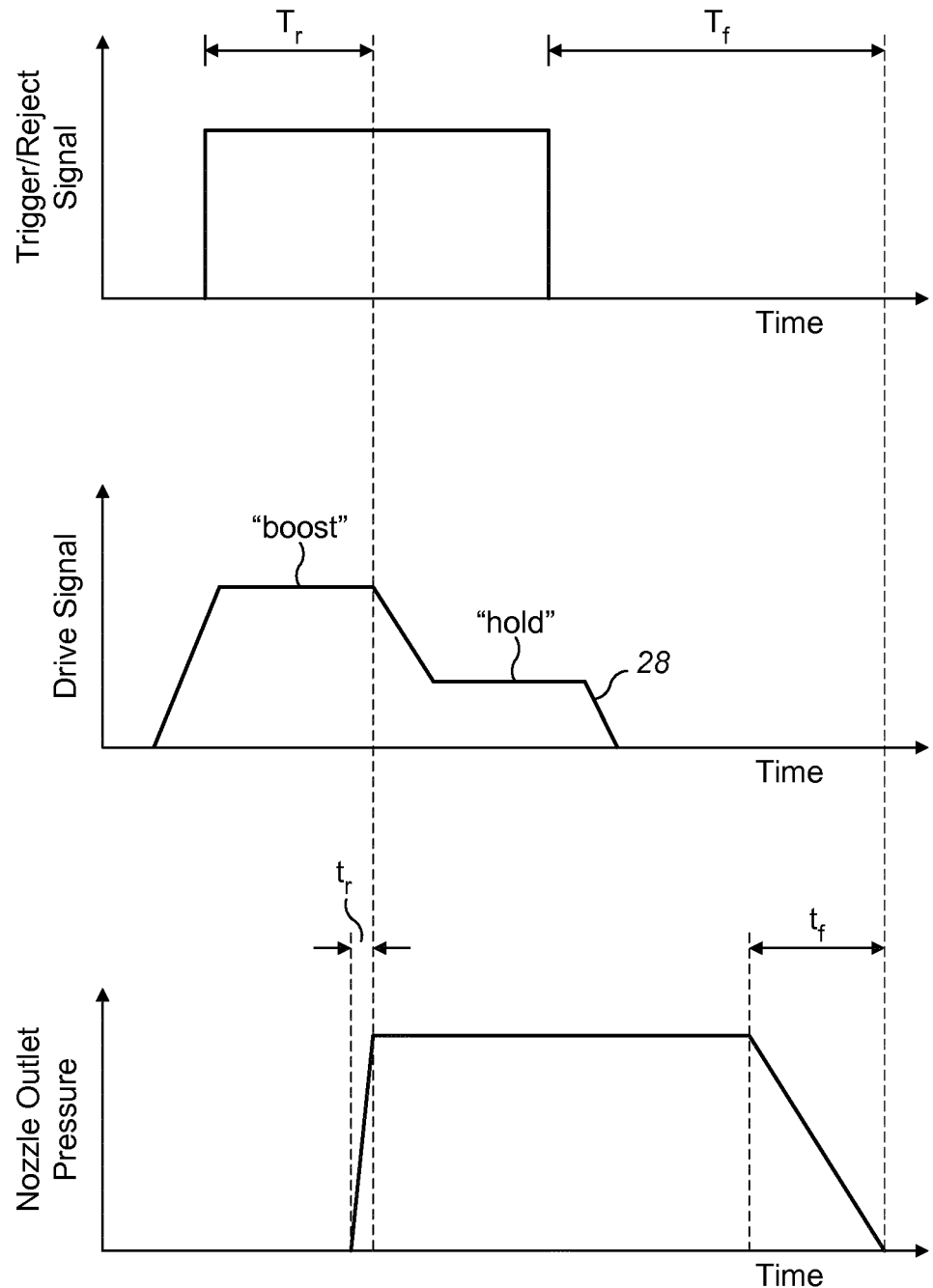
FIG. 3 is an illustration of an idealised temporal response of the ejector valve of FIG. 2.

The temporal response typical of an ejector valve 12a; 12b; 12c; 12d; 12e of the type shown in FIG. 2 is shown in FIG. 3, in which the upper chart depicts a trigger or "reject" signal provided by the aforementioned vision control system.

The middle chart of FIG. 3 shows a drive signal 28 subsequently provided by the processing and control module 14 via link 16 to the electromagnetic assembly 54 of the ejector valve 12a; 12b; 12c; 12d; 12e.

The lower chart of FIG. 3 indicates the physical temporal response of the ejector valve 12a; 12b; 12c; 12d; 12e measured by, in this embodiment, the ejector nozzle outlet pressure of the ejector valve 12a; 12b; 12c; 12d; 12e.

The trigger signal is generated by the aforementioned vision or colour or shape recognition and detection system, and input to the processing and control module 14, which then generates the drive signal 28. The drive signal 28 represents the magnitude and duration of a pulse and the ejector nozzle outlet pressure represents the magnitude of the pressure measured a distance downstream of the output port 48 of the ejector valve by a pressure transducer.

There is a time delay $T_r$ between the trigger/reject signal being applied and the ejector valve 12a; 12b; 12c; 12d; 12e being substantially open (typically defined as a flow greater than 80%-95% of the steady state flow of a fully opened ejector valve 12a; 12b; 12c; 12d; 12e), typically 1-2 ms.

The ejector valve opening time or 'rise time' $t_r$ of the ejector valve is shown in FIG. 3, and represents the time between the ejector valve 12a; 12b; 12c; 12d; 12e being substantially closed (typically defined as a flow less than 20%-5% of the steady state flow of a fully opened valve 12a; 12b; 12c; 12d; 12e) and the valve being substantially open, typically 1-3 ms.

There is a time delay $T_f$ between the end of the trigger/reject signal being applied and the ejector valve 12a; 12b; 12c; 12d; 12e being substantially closed as shown in the upper chart of FIG. 3.

Also shown in the lower chart of FIG. 3 is the ejector valve 12a; 12b; 12c; 12d; 12e close time or 'fall time' $t_f$ of the valve, which represents the time between the ejector valve 12a; 12b; 12c; 12d; 12e being substantially open and the ejector valve being substantially closed, typically 0.5-2 ms.

In one design of ejector valve 12a; 12b; 12c; 12d; 12e, the drive signal has a first current level, here comprising 12 Vdc, pulse width modulated to provide an amp or more, to open the valve 12a; 12b; 12c; 12d; 12e, a hold period at a second, lower current level so as to maintain the valve 12a; 12b; 12c; 12d; 12e in the open position and a reverse current to close the ejector valve 12a; 12b; 12c; 12d; 12e.

The signals shown in FIG. 3 are schematic and do not reflect the initial current peak or the reverse current, or voltage under or overshoots at the end of the pulses as typically found in real world operation.

Accordingly, if the rise and fall times vary for different ejector valves 12a; 12b; 12c; 12d; 12e in an ejector array 10, then the effective time of opening and closing of each ejector valve 12a; 12b; 12c; 12d; 12e with respect to the application of the drive signal will be different for each valve. This difference may depend on ambient operating temperature, the age and machining tolerances of each ejector valve 12a; 12b; 12c; 12d; 12e. Furthermore, in an array 10 of ejector valves 12a; 12b; 12c; 12d; 12e, the firing (opening and closing) of an ejector valve 12b may also, have an inductive electromagnetic effect which may influence the firing of its neighbours 12a; 12c in the array 10.

This means that different ejector valves 12a; 12b; 12c; 12d; 12e will have airflows rising above and falling below a trigger threshold at different times with respect to the application of the same drive signal 28. The trigger threshold is dependent on the product being sorted and is the threshold of airflow above which particles of product 20a; 20b; 20c will be deflected from the product stream 20 away from the sorting trajectory or pathway.

This impacts the performance of the ejector array 10 as a whole, because acceptable particles preceding and following the particle targeted for rejection or redirection might be deflected from the stream 20 in error, as well as or in place of the targeted particle 20a.

It has been found that the temporal response in terms of ejection pressure of an ejector valve 12a; 12b; 12c; 12d; 12e (approximately a few millimeters from the output port 48) of the type of valve shown in FIG. 2 is a function of the gap between the valve plate 52 and the valve seat 51 (the "valve gap").

In addition, this valve gap can be predicted by current and voltage changes with respect to time (temporal response) in the electromagnetic assembly 54 of that ejector valve 12a; 12b; 12c; 12d; 12e. Hence, the drive signal 28 can be adapted for each ejector valve based on the predicted temporal response, with real-time operation updating the drive signal 28 to further adapt.

In one embodiment the adaptation to the drive signal provided by the processing and control module 14 comprises measuring, in a calibration phase, a temporal response curve for each ejector valve prior to operating the machine in a sorting operation, comparing each response curve with a library set of previously stored response curves and determining a predicted flow to provide an adapted timing or drive signal to that ejector valve.

In order to provide calibration in this embodiment, an electrical drive signal 28 is applied to each of the electromagnetic assemblies 54 of the ejector valves 12a; 12b; 12c; 12d; 12e. The same signal may be applied to each assembly 54. The applied drive signal 28 may, for example, be suitable for causing the electromagnetic assemblies 54 of each ejector valve 12a; 12b; 12c; 12d; 12e to cycle through firing (i.e. opening and closing).

Then, in order to calibrate the valve assemblies in the array with respect to each other, for the rise time of the valves, the following calibration measurements can be undertaken.

a. The time taken for the current I in each electromagnetic assembly 54 to rise to a given threshold in response to the application of a drive signal 28 is measured. This may occur at the start of the current rise in the assembly 54 and the threshold may then be set so that it is reached before the valve plate 52 has moved off the valve seat 51. This ensures that the EMF effect of the movement of the valve plate 52 is removed from the measurement. The current in each coil can be measured by a current meter in the respective electromagnetic assembly 54 and the measured signal fed back to the processing and control module 14;

b. The time at which the rate of change of current with respect to time dI/dt reaches a particular value in response to the application of the drive signal 28. The rate of change of current dI/dt in each coil 56 can be measured by a current meter or sensor in the respective electromagnetic assemblies 54 and the measured signal fed back to the processing and control module 14;

c. The current in the electromagnetic assemblies 54, I, or the rate of change of current I in the electromagnetic assemblies 54 with respect to time, dI/dt, at a predetermined time delay after the application of a drive signal; or d. The value of current I in the electromagnetic assemblies 54 when the flux linkage associated with the core of each electromagnetic assembly 54 reaches a certain threshold or the value of the flux linkage when the current I reaches a certain threshold. The flux linkage associated with the coil 56 of the electromagnetic assembly 54 can be estimated by integration of the voltage applied to the coil 56, less any voltage drops which take account of the resistive losses in the coil 56. The accuracy of the estimation of magnetic flux in the core (and hence flux linkage associated with the main drive coil 56) can be further improved by the addition of a second coil, magnetically coupled to the main drive coil 56, but not used to carry drive current. The voltage induced in this second coil is an accurate measure of the rate of change of flux in the magnetic circuit. Integration of this induced voltage and scaling to adjust for numbers of turns gives a very accurate measure of flux linkage in the electromagnetic assembly 54. The flux linkage to current relationship will be a measure of valve gap or valve plate position. The measured data can also be compared to stored data to produce the required estimation of valve gap.

Hence a set of temporal response curves is obtained which is stored to form a library set of stored curves.

In response to the measurements above, the drive signal to each of the ejector valves 12a; 12b; 12c; 12d; 12e can be adapted so as to correlate the response of the ejector valves 12a; 12b; 12c; 12d; 12e with respect to each other when the sorting apparatus is operational.

In another embodiment the library set of stored temporal response curves is collected for different valve types and configurations, and subsequently stored.

In one embodiment the drive signal 28 is applied to the ejector valves 12a; 12b; 12c; 12d; 12e after a primary time delay after detection of a particle 20a to be ejected. The adaptation to the drive signal for each ejector valve 12a; 12b; 12c; 12d; 12e can be achieved by altering this primary time delay to take into account the predicted temporal response of the ejector valve.

In another embodiment the selection of the set of previously stored response curves is associated with the number of neighbouring ejector valves each ejector valve 12a; 12b; 12c; 12d; 12e has in the array. For example, with reference to FIG. 1a, ejector valves 12a and 12e each have only one neighbour (ejector valve 12b and ejector valve 12d) respectively, whereas ejector valves 12b, 12c and 12d each have two neighbouring ejector valves.

In this embodiment it was found that the temporal response curve of an ejector valve 12a; 12b; 12c; 12d; 12e depends on the number of nearest neighbours that ejector valve 12a; 12b; 12c; 12d; 12e has, which in turn depends on the configuration of the ejector valves 12a; 12b; 12c; 12d; 12e in the housing array 10.

The amount of electromagnetic noise present, and hence reproducible firing of a valve varies and depends upon, in an array, the number of its nearest neighbours.

Hence, in this embodiment, for each ejector valve 12a; 12b; 12c; 12d; 12e, the selection step of previously stored temporal response curves is dependent on the number of nearest neighbours that each valve has.

Typically, the temporal response of each valve is measured in a non-sorting operation or calibration phase as described above. This response is then compared with the appropriate, i.e. neighbour specific previously stored library of temporal response curves.

Any difference is taken into account by processing and control module 14, which, in sorting operation, provides an appropriate driving or timing signal for each ejector valve 12a; 12b; 12c; 12d; 12e. Hence, the influence of valves in close proximity to each other, and their configuration in an array, is predicted and adapted for.

Advantageously, various array configurations may be tested, and library sets stored, to enable calibration of future configurations as per customer desires or wishes.

In another embodiment, the measured temporal response curve for each ejector valve is determined by averaging the measured response curves over a number of operations of that ejector valve. For example, the valve may be operated 5 or 10 times to produce 5 or 10 air fluid outputs ("puffs"), the temporal response measured for each operation or "puff" and the average of each operation used in the comparison with the previously stored library set of temporal response curves.

In a further embodiment the predicted flow to provide the adapted timing signal to an ejector valve when sorting is determined by computing the cumulative error between the mean temporal response curve of the library set and the measured temporal response curve of the ejector valve, and selecting from the library set those curves with minimised cumulative error with respect to the measured valve temporal response curve to predict the flow.

In another embodiment the predicted flow is computed by weighting the flow of the library curves by the inverse of their cumulative errors.

Figure 4:
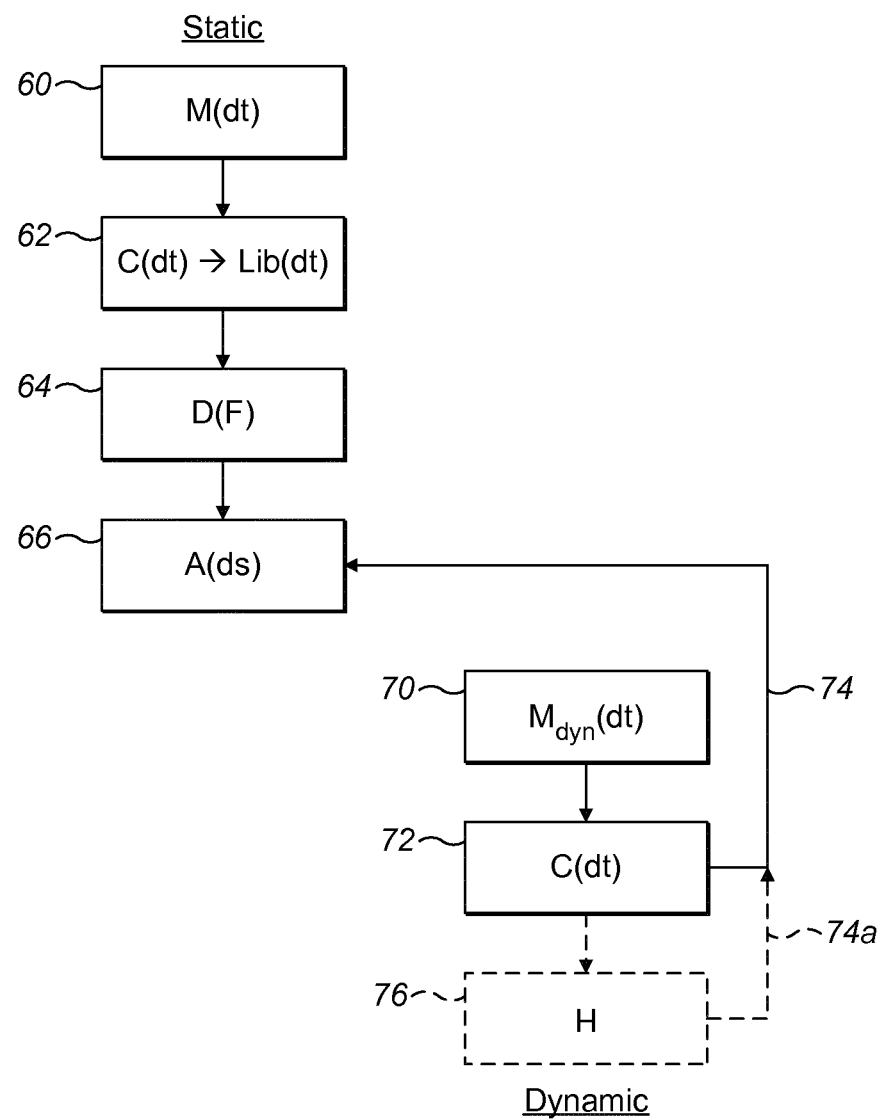
FIG. 4 is a flowchart depicting a method according to an embodiment of the present invention.

FIG. 4 illustrates method steps according to an embodiment of the present invention.

FIG. 4, at the left-hand side, illustrates steps 60, 62, 64, 66 in an embodiment when operating the apparatus in a static or calibration mode.

A temporal response curve is measured 60 for each ejector valve under test [M(dt)]. The measured temporal response curve for each ejector valve is then compared 62 with a library set of stored temporal response curves [C(dt)→Lib (dt)]. A predicted flow is then determined 64 for each ejector valve [D(F)], and a drive signal for each ejector valve is adapted 66 in dependence on the predicted flow [A(ds)].

FIG. 4, at the right-hand side, illustrates steps in an embodiment when operating the apparatus in a sorting or dynamic mode.

Whilst sorting, a real-time or dynamic temporal response curve is passively measured 70 for an ejector valve [$M_{dyn}$(dt)]. Temperature data may also be optionally measured as part of the dynamic data. This dynamic data is then compared 72 with the previously measured temporal response curves for that ejector valve [C(dt)] to determine deviations in predicted flow. These differences are then fed back 74 to the static mode dataset, which then adjusts the previously determined adapted drive signal 66, if required.

In another embodiment the comparison at step 72 is used to indicate a health parameter [H] at step 76, and this indication may also be fed back 74a to further adapt or modify any previously determined timings, or used to signify such a deviation that the valve should be replaced or serviced.

In the above methods and apparatus, adaptive control of the flow of a plurality of ejector valves arranged in an array in a sorting machine is described. The method comprises measuring a temporal response curve for each ejector valve, comparing the measured temporal response curve for each ejector valve to a library set of previously stored temporal response curves, determining from the comparison a predicted flow for each ejector valve, and adapting a drive signal for each ejector valve in dependence on the predicted flow. Temporal response curves may be measured and compared in a calibration (non-sorting) mode, and real-time feedback of the measured temporal responses in a sorting mode may be used to indicate health or condition of a valve and to further adapt the drive signal to provide conformal performance. The number of neighbouring ejector valves may also be taken into account.

Finally, it will be understood that the present invention has been described in its preferred embodiments and can be modified in many different ways without departing from the scope of the invention as defined by the appended claims.

The invention claimed is:

1. A method for providing adaptive control of the flow of a plurality of ejector valves arranged in an array in a sorting machine, the method comprising the steps of:

measuring a temporal response curve for each ejector valve;

comparing the measured temporal response curve for each ejector valve to a library set of previously stored temporal response curves, wherein the set of stored temporal response curves in the library is associated with the number of neighbouring ejector valves each ejector valve has in the array;

determining from the comparison a predicted flow for each ejector valve; and adapting a drive signal for each ejector valve in dependence on the predicted flow.

2. A method for providing adaptive control of the flow of a plurality of ejector valves arranged in an array in a sorting machine, the method comprising the steps of:

measuring a temporal response curve for each ejector valve;

comparing the measured temporal response curve for each ejector valve to a library set of previously stored temporal response curves, wherein the step of measuring a temporal response curve for each ejector valve comprises measuring a temporal response curve for each operation of the ejector valve over a number of operations of that ejector valve, and averaging the obtained response curves for each operation to produce the measured temporal response curve;

determining from the comparison a predicted flow for each ejector valve; and adapting a drive signal for each ejector valve in dependence on the predicted flow.

3. The method according to claim 2, wherein the set of stored temporal response curves in the library is associated with a flow parameter.

4. The method according to claim 3, wherein the flow parameter is associated with at least one electrical parameter.

5. The method according to claim 4, wherein the electrical parameter is (i) current associated with the ejector valve, (ii) rate of change of current associated with the ejector valve, (iii) flux or flux linkage associated with the ejector valve, or (iv) voltage associated with the ejector valve.

6. The method according to claim 2, wherein the step of adapting the drive signal comprises adjusting a time delay before the drive signal is applied and/or the length of a portion of the drive signal.

7. The method according to claim 2, wherein the step of adapting the drive signal comprises adjusting the applied voltage of the drive signal.

8. The method according to claim 2, wherein the step of adapting the drive signal comprises adjusting the height and/or length of a peak at the beginning of the drive signal.

9. The method according to claim 2, wherein the step of adapting the drive signal comprises adjusting the height and/or length of a hold period of the drive signal.

10. The method according to claim 2, wherein the step of adapting the drive signal comprises adjusting a rate of decay at the end of the drive signal.

11. The method according to claim 2, wherein the step of adapting the drive signal comprises adjusting the depth and/or length of a trough at the end of the drive signal.

12. The method according to claim 2, wherein, a dynamic temporal response curve of an ejector valve is measured during a sorting operation to determine a flow which is compared with the previously predicted flow to provide an indication of the health or condition of the ejector valve.

13. The method according to claim 12, wherein the indication of the health or condition of the ejector valve is used to further adapt the previously determined drive signal.

14. The method according to claim 13, wherein the indication of the health or condition of the ejector valve is associated with the ejector valve opening time, and the further adaptation of the drive signal comprises applying the deviation in time between the measured ejector valve opening time and a previously predicted flow represented by an associated ejector valve opening time.

15. The method according to claim 2, wherein the previously predicted flow is updated by the currently determined flow and timing of each ejector valve.

16. A method for providing adaptive control of the flow of a plurality of ejector valves arranged in an array in a sorting machine, the method comprising the steps of:

measuring a temporal response curve for each ejector valve;

comparing the measured temporal response curve for each ejector valve to a library set of previously stored temporal response curves;

determining from the comparison a predicted flow for each ejector valve, wherein the predicted flow for each ejector valve is determined by computing the cumulative error between the mean temporal response curve of the library set and the measured temporal response curve of the ejector valve, and selecting from the library set those temporal response curves which minimise error with respect to the measured temporal response curve to predict the flow; and adapting a drive signal for each ejector valve in dependence on the predicted flow.

17. The method according to claim 16, wherein the predicted flow is further determined by weighting the predicted flow of each of the selected library curves with respect to their respective error.

18. A method for providing adaptive control of the flow of a plurality of ejector valves arranged in an array in a sorting machine, the method comprising the steps of:

measuring a temporal response curve for each ejector valve;

comparing the measured temporal response curve for each ejector valve to a library set of previously stored temporal response curves, wherein the set of stored temporal response curves in the library is associated with temperature, and the ambient temperature of an enclosure housing the ejector valves is measured and used in the selection of library curves;

determining from the comparison a predicted flow for each ejector valve; and adapting a drive signal for each ejector valve in dependence on the predicted flow.

19. A sorting apparatus comprising a plurality of ejector valves arranged in an array, and having at least one processing and control module adapted to perform the method of claim 2.

* * * * *